J. H. JONES.
Grain Binder.

No. 90,666.

Patented June 1, 1869.

UNITED STATES PATENT OFFICE.

J. HERVA JONES, OF ROCKFORD, ILLINOIS.

IMPROVEMENT IN HARVESTERS.

Specification forming part of Letters Patent No. 90,666, dated June 1, 1869.

*To all whom it may concern:*

Be it known that I, J. HERVA JONES, of Rockford, in the county of Winnebago and State of Illinois, have invented a new and useful Improvement in Harvesting-Machines; and I do hereby declare that the following is a full and exact description of the same, reference being had to the accompanying drawings and to the letters of reference marked thereon.

My invention relates to that class of harvesters in which the grain is bound by persons riding on the machine, and constitutes an improvement on the machines for which Letters Patent No. 87,263 and 87,264 were granted to me on the 23d day of February, 1869.

The improvement consists, first, in a novel method of combining with a grain-receptacle an oblique binding-table, arranged on the inner or grain side of the front end of the receptacle.

Second. The improvement further consists in a novel method of combining with a grain-receptacle a binding-table on the inner or grain side of the rear end of the grain-receptacle.

Third. The improvement further consists in a novel method of combining a binder's stand or foot-board on the grain side of the grain-receptacle with binding-tables in front and rear of the binder's stand.

Fourth. The improvement further consists in a novel method of combining an elevating-conveyer with a grain-receptacle having an open bottom and curved sides.

Figure 1:
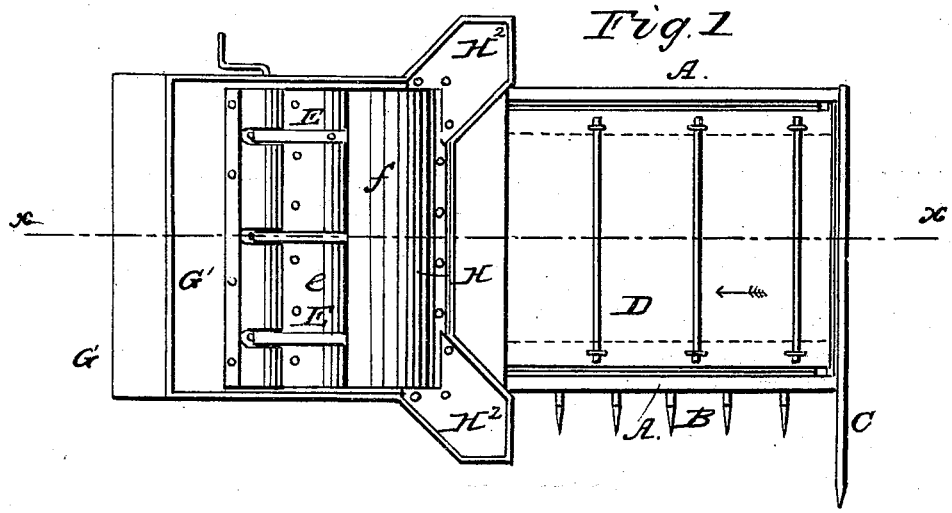
Figure 2:
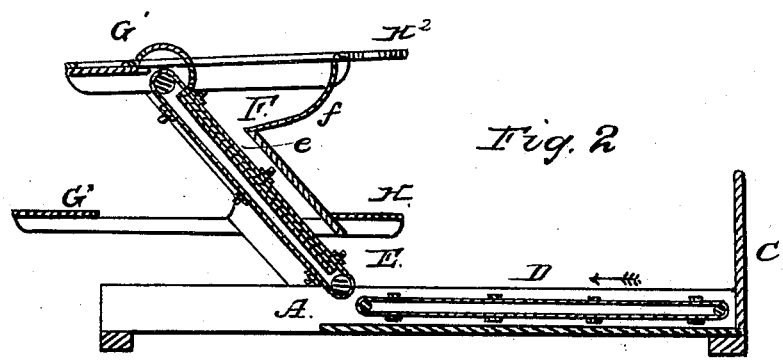

In the accompanying drawings, Figure 1 represents a plan or top view of so much of a harvester embracing my improvements as is necessary to illustrate my invention, and Fig. 2 a vertical transverse section through the same at the line $x\ x$ of Fig. 1.

In this instance, A represents the frame of the machine; B, the cutting apparatus; and C, a divider of well-known construction.

The cut grain falls on an endless apron, D, which conveys it to an elevating-conveyer or series of endless belts, E, as shown in my former patents, which deposit the grain in an open-bottomed receptacle, F, having its inner side $f$ curved, as shown in Fig. 2. A foot-board, G, and a binding-table, G', large enough to accommodate one or more binders, are arranged on the stubble side of the grain-receptacle. Another foot-board, H, is arranged on the opposite side of the grain-receptacle. Binding-tables $H^1$ $H^2$ are, respectively, attached to the front and rear ends of the grain-receptacle, and are, by preference, arranged obliquely thereto.

These tables may likewise be hinged to the receptacle, so as to be lowered out of the way, or may be made detachable.

I have found by experiment that the grain can be removed much more readily by making the inner side of the receptacle curvilinear or concave, as shown in Fig. 2.

It is obvious, in operation, that the driver might ride on the front binding-table $H^1$, or that, with a steady team, the grain might be bound by a person standing on the foot-board H, and guiding the machine at the same time.

What I claim as my invention, and desire to secure by Letters Patent, is—

1. The combination, with the grain-receptacle, of a binding-table, on the inner or grain side, and at or near the front end of said receptacle.

2. The combination, with the grain-receptacle, of a binding-table, on the inner or grain side, and at or near the rear end of said receptacle.

3. The combination of a binder's foot-board, on the inner side of the grain-receptacle, with binding-tables, respectively attached to the front and rear of the grain-receptacle.

4. The combination of the elevating-conveyer with the curved bottom $f$ of the grain-receptacle, as set forth.

This specification signed and witnessed this 12th day of March, 1869.

J. HERVA JONES.

Witnesses:
BYRON GRAHAM,
JOHN HOLLISTER.